(12) United States Patent
Princivalle (10) Patent No.: US 11,781,562 B2
(45) Date of Patent: Oct. 10, 2023

(54) TRANSONIC TURBOMACHINE COMPRESSOR

(71) Applicant: SAFRAN AERO BOOSTERS SA, Herstal (BE)

(72) Inventor: Rémy Henri Pierre Princivalle, Haccourt (BE)

(73) Assignee: SAFRAN AERO BOOSTERS SA, Herstal (BE)

( * ) Notice: Subject to any disclaimer, the term of this patent is extended or adjusted under 35 U.S.C. 154(b) by 0 days.

(21) Appl. No.: 17/796,981

(22) PCT Filed: Feb. 26, 2021

(86) PCT No.: PCT/EP2021/054872
§ 371 (c)(1),
(2) Date: Aug. 2, 2022

(87) PCT Pub. No.: WO2021/170819
PCT Pub. Date: Sep. 2, 2021

(65) Prior Publication Data
US 2023/0057786 A1      Feb. 23, 2023

(30) Foreign Application Priority Data
Feb. 28, 2020   (BE) .................................. 2020/5137

(51) Int. Cl.
*F04D 29/54*    (2006.01)
*F04D 21/00*    (2006.01)
*F04D 29/32*    (2006.01)

(52) U.S. Cl.
CPC ........... *F04D 29/544* (2013.01); *F04D 21/00* (2013.01); *F04D 29/324* (2013.01); *F04D 29/547* (2013.01)

(58) Field of Classification Search
CPC ...... F04D 29/544; F04D 21/00; F04D 29/324; F04D 29/547; F01D 5/141; F01D 9/041
See application file for complete search history.

(56) References Cited

U.S. PATENT DOCUMENTS

| 3,546,880 A | 12/1970 | Schwaar |
| 8,678,757 B2 * | 3/2014 | Li ........................ F04D 29/324 |
| | | 416/243 |

(Continued)

FOREIGN PATENT DOCUMENTS

| DE | 1212242 B | 3/1966 |
| EP | 2669475 A1 | 12/2013 |

OTHER PUBLICATIONS

International Search Report for PCT/EP2021/054872 dated May 10, 2021.
Written Opinion for PCT/EP2021/054872 dated May 10, 2021.

Primary Examiner — Courtney D Heinle
Assistant Examiner — Andrew Thanh Bui
(74) Attorney, Agent, or Firm — Sandberg Phoenix & von Gontard, PC (57) ABSTRACT

A transonic compressor of a turbomachine comprising exactly two or exactly three annular rows of rotor blades and respectively exactly one or exactly two annular rows of intermediate stator vanes interposed between two respective rows of rotor blades, wherein the flow velocity relative to the rotor downstream of the intermediate stator vanes is less than or equal to a Mach number of 0.9 over a radial portion of the blades extending over the radially inner 40% of the blades, and less than or equal to a Mach number of 1 over a radial portion extending over the radially inner 80% of the blades, and less than or equal to a Mach number of 1.05 over a radial portion extending over the radially outer 20% of the blades.

10 Claims, 4 Drawing Sheets (56) References Cited

U.S. PATENT DOCUMENTS

| | | | |
|---|---|---|---|
| 9,957,973 B2 * | 5/2018 | Iliopoulou | F01D 5/141 |
| 10,208,765 B2 * | 2/2019 | Froebel | F01D 5/141 |
| 2002/0197156 A1 * | 12/2002 | Haller | F01D 5/141 |
| | | | 416/223 R |
| 2013/0149100 A1 | 6/2013 | Lawlor et al. | |

* cited by examiner

TRANSONIC TURBOMACHINE COMPRESSOR

The present invention is the US national stage under 35 U.S.C. § 371 of International Application No. PCT/EP2021/054827 which was filed on Feb. 26, 2021, and which claims the priority of application BE 2020/5137 filed on Feb. 28, 2020 the contents of which (text, drawings and claims) are incorporated here by reference in its entirety.

FIELD

The invention relates to the design of a turbomachine compressor and in particular to the geometry of the stator and rotor blades of a transonic compressor.

FIELD

EP 2,669,475 A1 describes an axial turbomachine and focuses in particular on an S-shaped geometry for a subsonic blade, i.e., particularly suitable for compressor rotor speeds that are such that the blade speed is below the speed of sound at any point of the blade.

In order to reduce the weight and size of a turbomachine, it is possible to make compressors, and in particular the low-pressure compressor, more compact by reducing the number of compression stages that constitute the compressor. However, in order to achieve the same compression ratio with fewer stages, the rotor must rotate faster.

When the speed of the rotor blades exceeds the speed of sound, the geometry disclosed in EP 2 669 475 A1 is no longer suitable. In particular, the relative speed of the airflow at the inlet of the rotors becomes higher than the speed of sound and flow blocking phenomena and aerodynamic losses by impact occur.

These phenomena also have a feedback effect towards the upstream direction: a downstream rotor whose blades are radially positioned closer to the axis of rotation and which would create a blockage at the head of the blades, would disturb in feedback the operation at the foot of the blades of the upstream rotor.

The state-of-the-art compressor is therefore not suitable for transonic speeds.

The advantage of reducing the number of compression stages in such a compressor is therefore diminished by the range of usable speeds, which is not as high as desired to achieve good compressor efficiency.

SUMMARY

The technical problem of the invention is to provide a compressor design that allows a wider range of rotor speeds, while avoiding the risk of flow blockage at high speeds.

The invention relates to an aircraft turbomachine transonic compressor comprising exactly two or exactly three annular rows of rotor blades and respectively exactly one or exactly two intermediate annular rows of stator vanes, interposed between two successive rows of rotor blades, wherein the angle of the air flow at the outlet of the intermediate stator vanes of the single annular row of stator vanes or of at least one of the two annular rows of stator vanes, in particular the most upstream one, is on average greater than 15° over the height of these blades and is greater than 15°, in various instances greater than 20°, over a radial portion of these stator vanes comprised between 60% and 80% of the height of these blades.

As used herein, the word "transonic", will be understood to mean a compressor whose rotor blades have a speed of Mach number close to 1.2 to 1.4 (at the compressor inlet) and close to 1.4 to 1.7 within the compressor.

Thus, by diverting the air flow at the outlet of the intermediate stator vanes, it is possible to control the relative speed of the flow at the inlet of the rotor(s) downstream of the intermediate stator vanes and thus avoid blocking phenomena.

The value of 20° is critical because below this value, the relative speed of the fluid becomes too high and blockage is very likely.

The invention can also be defined by the inlet and outlet angles of the intermediate stator vanes: a transonic compressor of aircraft turbomachinery comprising exactly two or exactly three annular rows of rotor blades and respectively exactly one or exactly two annular row(s) of intermediate stator vanes, interposed between two successive rows of rotor blades, compressor in which the exit angle of the intermediate stator vanes of the single annular row of stator vanes or of at least one of the two annular rows of stator vanes, in particular the most upstream one, is on average greater than 9° over the height (H) of these blades and is greater than 9°, in various instances greater than 14°, over a radial portion of these stator vanes comprised between 60% and 80% of the height of these blades.

As explained below, under nominal conditions (blade tip speed between 360 m/s and 420 m/s), the difference between the blade exit angle and the direction of flow can be in the order of 5° or 6°.

According to an advantageous embodiment of the invention, the compressor comprises an annular row of downstream stator vanes, downstream of the most downstream annular row of rotor blades, the difference between the angle of the inlet airflow and the angle of the outlet airflow of these blades being less than 40° over a radial portion extending from 10% to 90% of their radial height, and less than 50° over the radial portions below 10% and above 90% of their radial height.

This limited camber of the most downstream stator of the compressor allows a well-controlled flow within the structural casing directly downstream of the compressor and thus also to the high-pressure compressor and avoids feedback blockage at the last rotor.

According to an advantageous embodiment of the invention, the two or three rows of rotor blades are two rows of rotor blades comprising a row of upstream blades and a row of downstream blades, the average of the difference between the angles of the inlet and outlet flow along the entire height of the upstream blades being greater than or equal to 1.4 times, in various instances greater than or equal to 1.5 times, the average of the difference between the angles of the inlet and outlet flow along the entire height of the downstream blades.

The arithmetic average of the angular differences along the entire height of the blade gives a picture of the aerodynamic load received by the blade. The greater the difference, the more the flow will be deflected. This translates into a blade that is cambered and will be more loaded the more the flow is deflected, for a given incoming air flow.

Thus, the first upstream rotor will be the one which is aerodynamically the most loaded. This allows the following rotors to be less cambered and less aerodynamically loaded and the risk of blockage on the following rotors is therefore reduced, while guaranteeing a nominal compression ratio over the whole compressor. The risk of blockage on the first rotor is not a problem because there is no rotor further upstream of it that would be prevented from working well over its full height.

According to an advantageous embodiment of the invention, the two or three rows of rotor blades are three rows of rotor blades comprising a row of upstream blades and a row of intermediate blades, the average of the difference between the inlet and outlet flow angles along the entire height of the upstream blades being greater than or equal to 1.2 times the average of the difference between the inlet and outlet flow angles along the entire height of the intermediate blades. The three rows further comprise a row of downstream blades, and optionally the average of the difference between the inlet and outlet flow angles along the entire height of the upstream blades is greater than or equal to 1.4 times the average of the difference between the inlet and outlet flow angles along the entire height of the downstream blades. Thus, in the same way as for the two-row rotor compressor mentioned above, the downstream rotor blades are less stressed and are less likely to generate aerodynamic blockage.

According to an advantageous embodiment of the invention, the flow velocity relative to the rotor that it encounters at the outlet of the intermediate stator rows is less than or equal to a Mach number of 0.9 over a radial portion of the rotor blades extending over the radially inner part of 40% of the radial height of the blades, and less than or equal to a Mach number of 1 over a radial portion extending over the radially inner part of 80% of the radial height of these blades, and less than or equal to a Mach number of 1.05 over a radial portion extending over the radially outer part of 20% of the radial height of these blades.

According to an advantageous embodiment of the invention, the direction of flow at the outlet of the rotor rows is inclined by more than 40°, in various instances is inclined by 45° to 50° on average over the height of the blades, with respect to the axis of rotation of the blades.

According to an advantageous embodiment of the invention, the exit speed of the most upstream rotor blades is less than a Mach number of 0.8.

According to an advantageous embodiment of the invention, the two or three rows of rotor blades comprise an upstream-most row and a downstream-most row, and the enthalpy variation between the outlet and inlet of the blades of the upstream-most row is at least 1.4 greater than the enthalpy variation between the outlet and inlet of the blades of the downstream-most row.

The invention also relates to a turbomachine comprising a low-pressure compressor, a high-pressure compressor, a structural casing upstream of the low-pressure compressor and an intermediate structural casing between the low-pressure compressor and the high-pressure compressor, the structural casings delimiting a swan-necked airflow, wherein the low-pressure compressor conforms to one of the above-mentioned embodiments and is arranged directly downstream of the upstream casing and directly upstream of the intermediate casing.

The turbomachine can comprise a fan as well as a gearbox arranged between either of the compressors and the fan.

The word "directly" is herein used to mean that there is no annular row of blades (rotor blades or stator vanes) between the casings and the compressor.

The invention also relates to the use of the compressor or turbomachine set forth above, wherein the rotor blades rotate at a speed such that their radially outer tips move at a speed between 360 m/s and 420 m/s.

According to an advantageous embodiment of the invention, the speed of the rotor blades is greater than 340 m/s over a radially outer portion extending over at least 30% of the height of the rotor blades.

According to an advantageous embodiment of the invention, the direction of flow directly downstream of the intermediate stator vanes is inclined with respect to the axis of rotation of the rotor blades by an average angle along the height of the blade of at least 15° and is inclined by an average angle along a radial portion of the stator vanes comprised between 60% and 80% of the height of the blades of at least 20°.

According to an advantageous embodiment of the invention, the velocity of the flow relative to the rotor which it encounters at the outlet of the intermediate stator rows is less than or equal to a Mach number of 0.9 over a radial portion of the blades extending over the radially inner part of 40% of the radial height of the blades, and less than or equal to a Mach number of 1 over a radial portion extending over the radially inner part of 80% of the radial height the blades, and less than or equal to a Mach number of 1.05 over a radial portion extending over the radially outer part of the 20% of the radial height of the blades.

According to an advantageous embodiment of the invention, the two or three rows of rotor blades comprise an upstream-most row and a downstream-most row, and the load on the upstream-most row is at least 1.4 greater than the load applied on the downstream-most row.

The "load" is the increase of enthalpy divided by the square of the rotational speed. The enthalpy increase is measured by the temperature increase between the inlet and outlet of the blade. This increase is related to the deviation of the air flow as explained below.

The invention is particularly advantageous in that it allows a compressor to operate with only two or three high-speed compression stages thanks to a control of the relative speeds at the approach of the rotors downstream of the intermediate stators of the compressor.

DETAILED DESCRIPTION

In the following description, the terms "internal" and "external" refer to a position with respect to the axis of rotation of a turbomachine. The axial direction is the direction along the axis of rotation of the turbomachine. The radial direction is perpendicular to the axis of rotation. Upstream and downstream are in reference to the main flow direction of the flow in the turbomachine.

The figures are not drawn to scale. In particular, the thickness is enlarged for ease of reading the figures.

The term "height" refers to a dimension measured along the largest dimensional direction of the blades, which can be a radial direction or a direction that is slightly inclined to the radial direction, due to the slope of the air stream.

The chord is the line segment connecting the leading edge to the trailing edge in a plane perpendicular to a radius. The camber is the median curve line connecting the leading edge to the trailing edge at equidistance of the pressure and suction surface.

Figure 1:
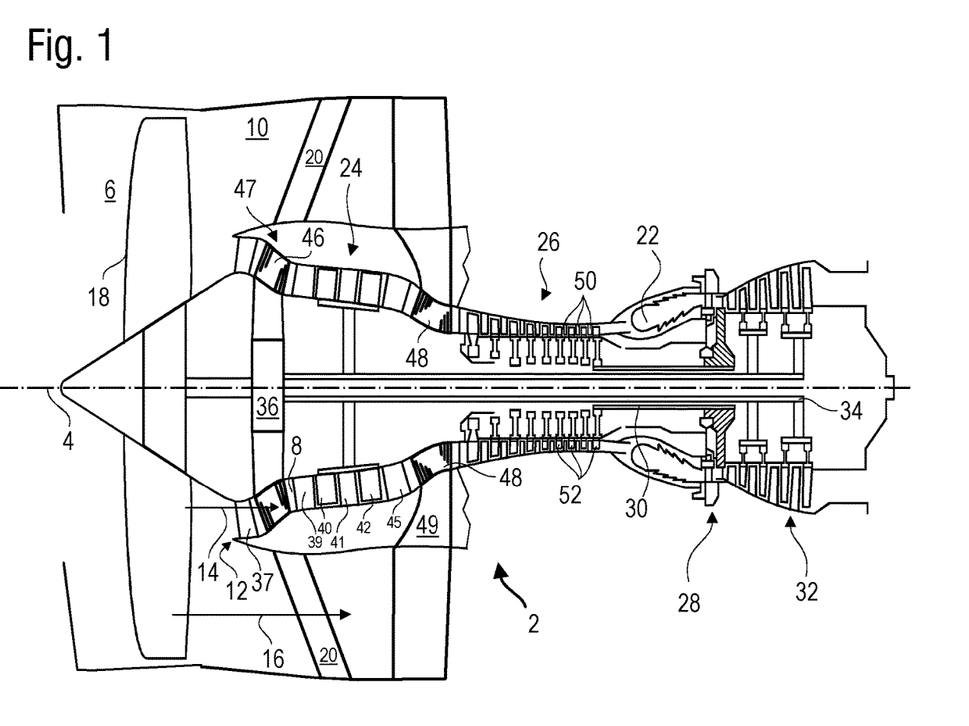
FIG. 1 exemplarily schematically describes a turbomachine in accordance with various embodiments of the present invention.

FIG. 1 represents an axial turbomachine in a simplified way. This is here a dual-flow turbojet engine 2.

The turbomachine 2 has an axis of rotation 4. An annular inlet 6 divides into a primary duct 8 and a secondary duct 10 thanks to a circular separation nozzle 12.

A primary flow 14 and a secondary flow 16 pass through these ducts 8 and 10 respectively, which meet at the outlet of the turbomachine 2. The primary flow 14 and the secondary flow 16 are coaxial annular flows and are fitted into each other. They are channeled by the internal and external walls of the turbomachine 2.

The secondary flow 16 is accelerated by a fan 18 arranged at the inlet 6, in order to generate thrust for the flight of an aircraft. Straightening blades 20 can be arranged in the secondary flow duct 10 and configured to increase the axial component of the secondary flow velocity vector. The fan 18 is arranged upstream of the primary duct 8 and the secondary duct 10.

The turbomachine 2 comprises a compression zone formed by two compressors 24, 26, a combustion chamber 22 and an expansion zone 28, 32. The compressors 24, 26 consist of a low-pressure compressor 24 and a high-pressure compressor 26.

The high-pressure compressor 26 is located at the inlet of the combustion chamber 22.

Downstream of the combustion chamber 22, the turbomachine 2 can have a high-pressure turbine 28 coupled to a high-pressure shaft 30, then a low-pressure turbine 32 coupled to a low-pressure shaft 34. The latter can be independent in rotation from the high-pressure shaft 30. These turbines 28, 32 form the expansion zone of the primary flow 14.

During operation, the mechanical power received by the turbines 28, 32 is transmitted to the shafts 30, 34 which set in motion the compressors 24, 26. The latter comprise several rows of rotor blades associated with rows of stator vanes. The rotor blades are integrally or kinematically driven by the shafts 30, 34 around the axis of rotation 4 to generate a flow of air and progressively compress the latter to the inlet of the combustion chamber 22.

The turbomachine includes gearing means, such as a reduction gear 36, which drives the fan 18 at a lower speed of rotation than the rotor blades of the low-pressure compressor. Thus, two turbines are sufficient to drive the compressors and the fan at three different respective rotational speeds.

In particular, the gearbox 36 allows the low-pressure compressor 24 to be compact (fewer compression stages) because it can rotate at high speed and particularly transonic speeds while the blower 18 rotates at subsonic speeds.

In the illustration in FIG. 1, the low-pressure compressor 24 comprises two annular rows of rotor blades 40, 42 integral with the shaft 34. Alternatively, the compressor can comprise three annular rows of rotor blades.

The compressor 24 includes annular rows of stator vanes including an inlet row 39, an intermediate stator row 41 axially interposed between two rotor rows and a downstream stator row 45. Alternatively, when the compressor comprises three rows of rotor blades, a second intermediate stator row is provided between the second and third rotor rows.

The blades 39 can be variable stator vanes (VSV). In the present application, the vanes 39 will be considered in the angular position they take during flight ("cruise").

The compressor 24 is located directly downstream of a casing support 47 and directly upstream of another casing support 49.

These casings 47, 49 can comprise annular ducts forming sections of the primary flow duct 8 and can have struts 46, 48 extending radially through the flow duct 8. The annular ducts of the casings can have swan neck profiles. They can mark significant reductions in the diameter of the primary flow duct 8.

The upstream casing 47 and its arms 46 can support the gearbox 36.

Upstream of the arms 46 is a row of stator vanes 37 near the nozzle 12.

Downstream of the arms 48 is the high-pressure compressor 26 equipped with stator vanes 50 and rotor blades 52. The latter are driven in rotation by means of the shaft 30.

Figures 2, 3:
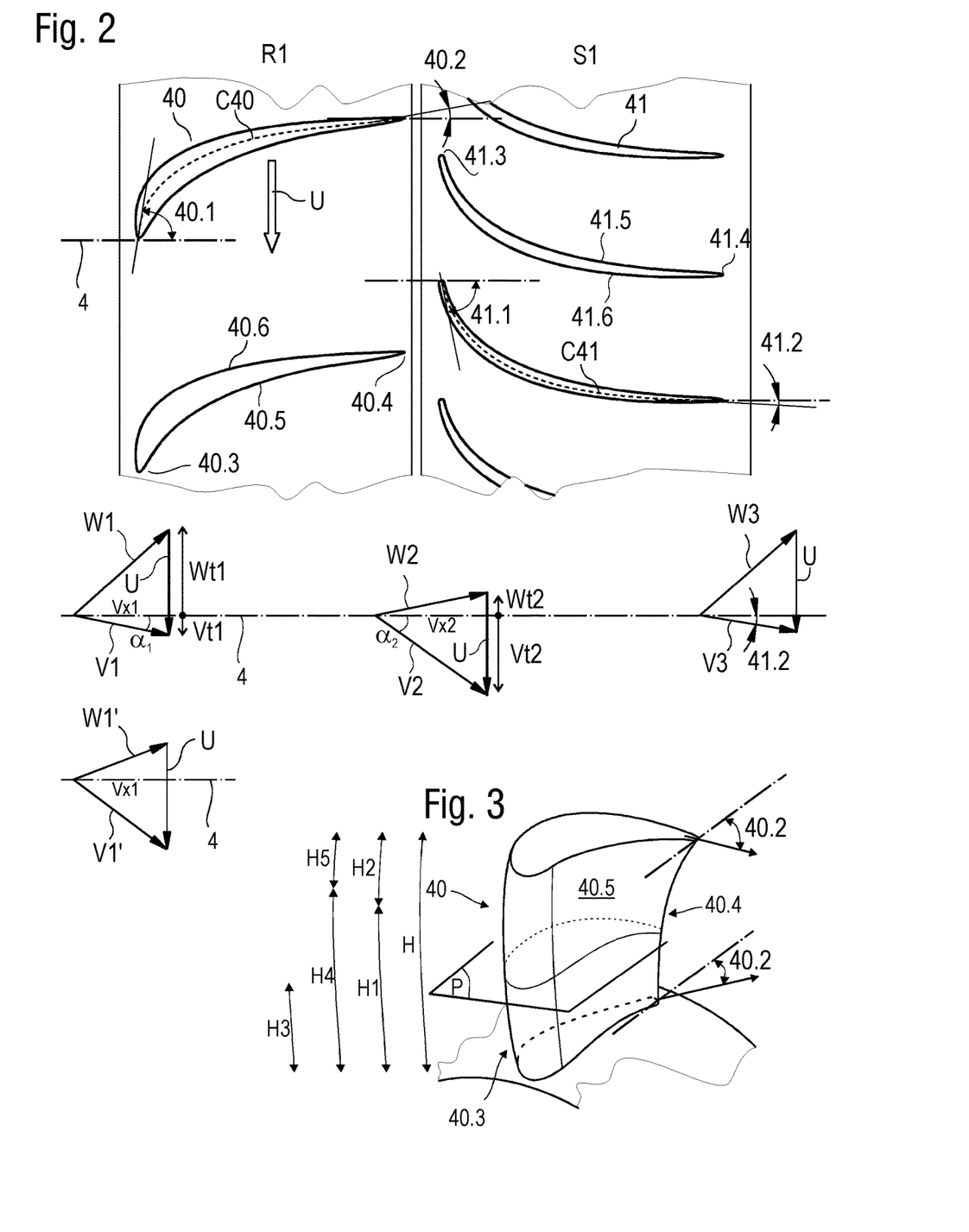
FIG. 2 exemplarily shows a rotor/stator stage with speed diagrams in accordance with various embodiments of the present invention.
FIG. 3 exemplarily shows a rotor blade in isometric view in accordance with various embodiments of the present invention.

FIG. 2 illustrates some parameters that help define the geometry of a compression stage formed by a rotor R1 and a stator S1, seen in a plane parallel to axis 4 and perpendicular to one of these radii, at a distance r from axis 4. To be exact, FIG. 2 is a representation of a developed projection on a plane (P in FIG. 3) of some adjacent blades. The rotor blades 40 accelerate the fluid flow with energy transmitted through the drive shaft 34. The stator stage of vanes 41 "transforms" the kinetic energy into pressure due to the shape of the stator vanes.

The blades rotate at a rotational speed $\omega$ about axis 4, which means that a point on the blade with radial coordinate r will have a speed $U=r\omega$. In the illustrated examples, all rotor blades rotate at the same speed $\omega$ and the velocity in the cross-section plane P is therefore U for all rotor blades.

The camber line of the blades 40, 41 is noted as C40 and C41 and is shown in dashed lines.

The vector diagram to the left of the rotor blades 40 corresponds to the state of the fluid at the inlet to the compression stage. The fluid comes in with an absolute velocity V1, according to an orientation that depends on the turbomachinery elements preceding the compressor. The relative velocity vector W1 of the fluid entering the rotor is deduced by subtracting the vectors U from V1.

For comparison, a diagram representing another absolute inlet velocity V1' is shown. Compared to V1, V1' is more inclined with respect to the axis 4 but the two speeds V1 and V1' have the same axial component Vx1. It follows, for the same rotational speed U, a relative speed W1' whose absolute value is lower than W1.

Thus, for the same value of the axial component of the inlet speed, if it is more or less inclined, the relative speed of the air with respect to the rotor is different.

At the outlet of the rotor R1, the fluid has a relative speed W2 whose orientation depends on the geometry of the blades. By adding vector U to vector W2, the absolute output velocity V2 is obtained which is greater in value than V1.

Then, the stator vanes 41 deflect and decelerate the fluid, this deceleration resulting in a pressure increase. The direction of the velocity V3 depends, among other things, on the geometry of the stator vanes.

The geometry of the blades can be described in part by their inlet and outlet angles.

The "inlet angle" of a blade is the angle formed in a plane parallel to the compressor axis and perpendicular to a radius, between the tangent to the camber line and the compressor axis, at the leading edge.

The "exit angle" of a blade is the angle formed in a plane parallel to the compressor axis and perpendicular to a radius, between the tangent to the camber line and the compressor axis at the trailing edge of the blade.

Thus, the relative velocity W2 is substantially oriented along the exit angle of the rotor blades 40 and the velocity V3 is substantially oriented along the exit angle of the stator vanes 41. Under nominal conditions (blade tip speed between 360 m/s and 420 m/s), the difference between the exit angle of the blades 41 and the direction of the flow V3 can be in the order of 5° or 6°. The invention has been defined for flow angles greater than 15° on average and greater than 15° between 60% and 80% of the blade height. It can also be defined by stator vane exit angles which on average are more than 9° and which in the range 60%-80% are more than 9°, in various instances more than 14°.

The enthalpy increase that can be noted $\Delta H$ in the rotor R1 is $U \times (Vt2-Vt1)$ according to the Euler equation, where U is the rotation speed (in m/s) of the rotor, Vt1 and Vt2 are the tangential speeds of the air flow respectively at the inlet and at the outlet of the rotor, in the frame of reference fixed to the motor.

In the relative frame of reference of the rotor, the tangential velocity of the flow (respectively at the inlet and outlet) is $Wt1=Vt1-U$ and $Wt2=Vt2-U$.

If the axial velocity of the airflow is Vx1 and Vx2 at the inlet and outlet of the rotor, respectively, the angles of the airflow relative to the rotor are $\alpha 1=\arctan(Wt1/Vx1)$ and $\alpha 2=\arctan(Wt2/Vx2)$, i.e., are $\alpha 1=\arctan((Vt1-U)/Vx1)$ and $alpha2=\arctan((Vt2-U)/Vx2)$.

Thus, the enthalpy increase that is proportional to the difference in the tangential velocity difference between the rotor inlet and outlet (Vt2−Vt1) is found not proportionally, but correlated, in the rotor deflection $\alpha 2-\alpha 1$, which is effectively $\arctan((Vt2-U)/Vx2)-\arctan((Vt1-U)/Vx1)$.

It should be noted that 4x.1 the inlet airflow angle and 4x.2 the outlet airflow angle of the individual blades (where x=1, 2, 3, 4 or 5).

It is important to note that the angles 4x.1, 4x.2 vary over the height of the blades.

The difference between the inlet and outlet angles of the flow can be noted as $\Delta 4x=|4x.1-4x.2|$. This difference also characterizes the camber of a blade. For example, $\Delta 40=|40.1-40.2|$. If the angles are very different, the blade is highly cambered. For a rotor blade, this results in a large aerodynamic load. For a stator vane, this results in a significant flow deflection (deflection=difference between the inlet flow angle and the outlet flow angle of the blades). As the angles 4x.1 and 4x.2 vary along the height of a blade/vane, an arithmetic average over the entire height of the blade/vane will be used, which will be noted $<\Delta 4x>$.

The load is the enthalpy change divided by the square of the rotational speed. Thus, a highly cambered vane will allow more compression. The camber limit is generally governed by mechanical strength and in our case by the desire not to create blockage at supersonic speed.

According to the same principle as mentioned above for V1', the geometry of the blade influences the outlet angle of the flow 41.2 which defines the direction of the speed V3 and thus the value of the relative speed of the flow W3 with respect to the rotor downstream of S1 (not shown). A large value of the angle 41.2 therefore implies a smaller value of W3.

Also shown in FIG. 2 are the leading edges 40.3, 41.3, trailing edges 40.4, 41.4, pressure sides 40.5, 41.5 and suction sides 40.6, 41.6 of the blades 40, 41.

FIG. 3 illustrates an isometric view of a rotor blade 40, showing in particular a possible position of the plane P in which the cross-section of FIG. 2 is made. This figure also shows the height H of the blade and different portions of this height: H1 extends over 70% of the height of the blade, internal side; H2 extends over 30% of the blade, external side; H3 corresponds to the internal 40%; H4 to the internal 80% and H5 to the external 20%.

FIG. 3 also highlights the variations in airflow angle 40.2 between a radial position at the root of the blade and a radial position at the head of the blade. The same is true for any angles 4x.1 or 4x.2 that can vary from the blade root (or "foot") to the blade tip (or "head").

Figure 4:
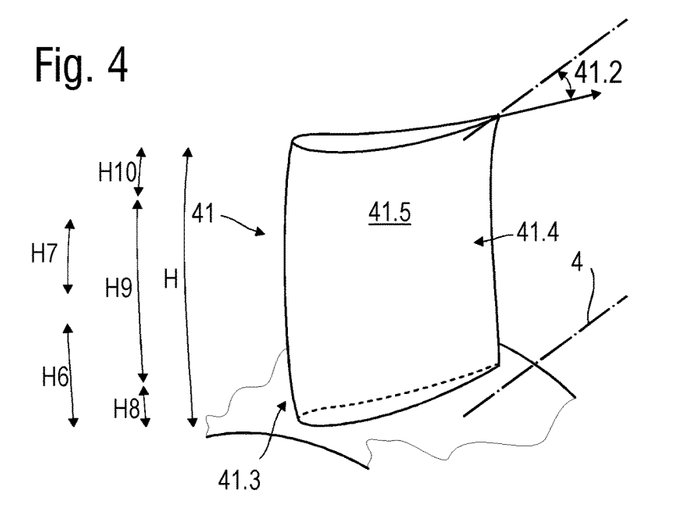
FIG. 4 exemplarily shows an isometric view of a stator vane in accordance with various embodiments of the present invention.

FIG. 4 shows an isometric view of a stator vane 41. This figure shows the height H of the stator vane (substantially equal to that of the preceding rotor blade) and different portions of this height: H6 extends over 40% of the vane height, inner side; H7 extends between 60% and 80% of the vane, outer side; H8 corresponds to the inner 10%; H9 extends between inner 10% and outer 10%; and H10 corresponds to the outer 10%.

Figure 5:
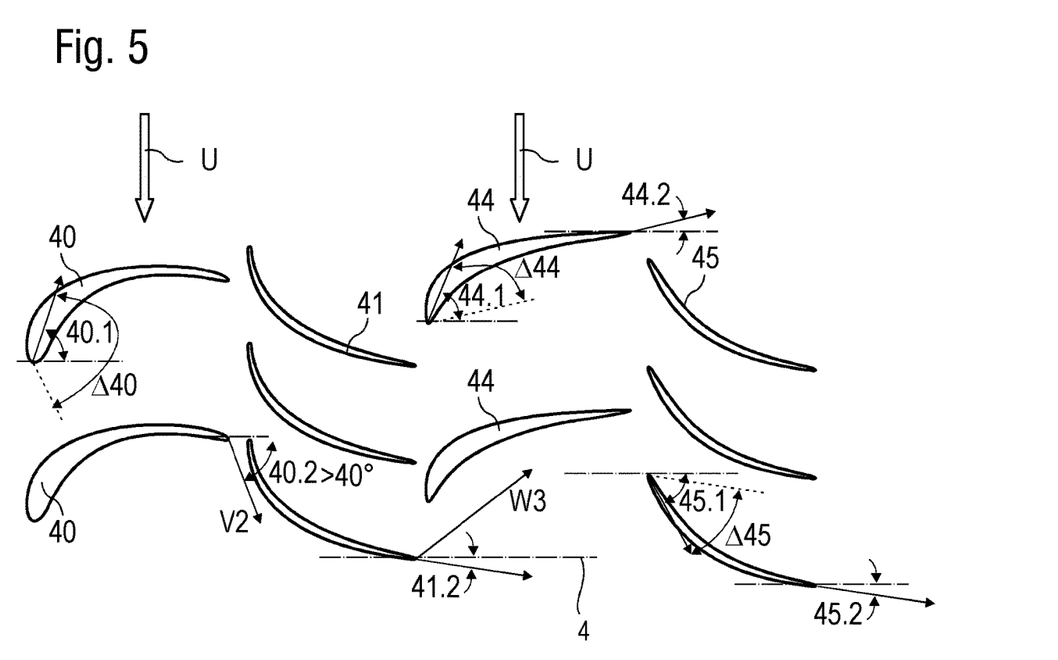
FIG. 5 exemplarily shows an example of a two-stage compressor in accordance with various embodiments of the present invention.

FIG. 5 illustrates an example in which the compressor comprises exactly two rows of rotor blades 40, 44 and two rows of stator vanes 41, 45.

According to various embodiments of the invention, the flow angle 41.2 is greater than 15° on average over the height H of the blades 41 and is greater than 20° in average over the portion H7 that forms the radial part between 60% and 80% of the radial height of the blade 41. It is understood that the geometry of the vane is smooth and does not have corners or angular points, with connecting radii being provided if necessary, between the portions greater than 15° and the portions greater than 20°.

FIG. 5 also highlights the direction of the velocity V2 at the exit of the vane 40 materialized by the angle 40.2 which is greater than 40°.

The differences in angles $\Delta 40$ and $\Delta 44$ are also observed, with the ratio $\Delta 40/\Delta 44$ greater than or equal to 1.4. As for the flow deflection $\Delta 45$ on the stator vanes 45, it is less than 50°.

Figure 6:
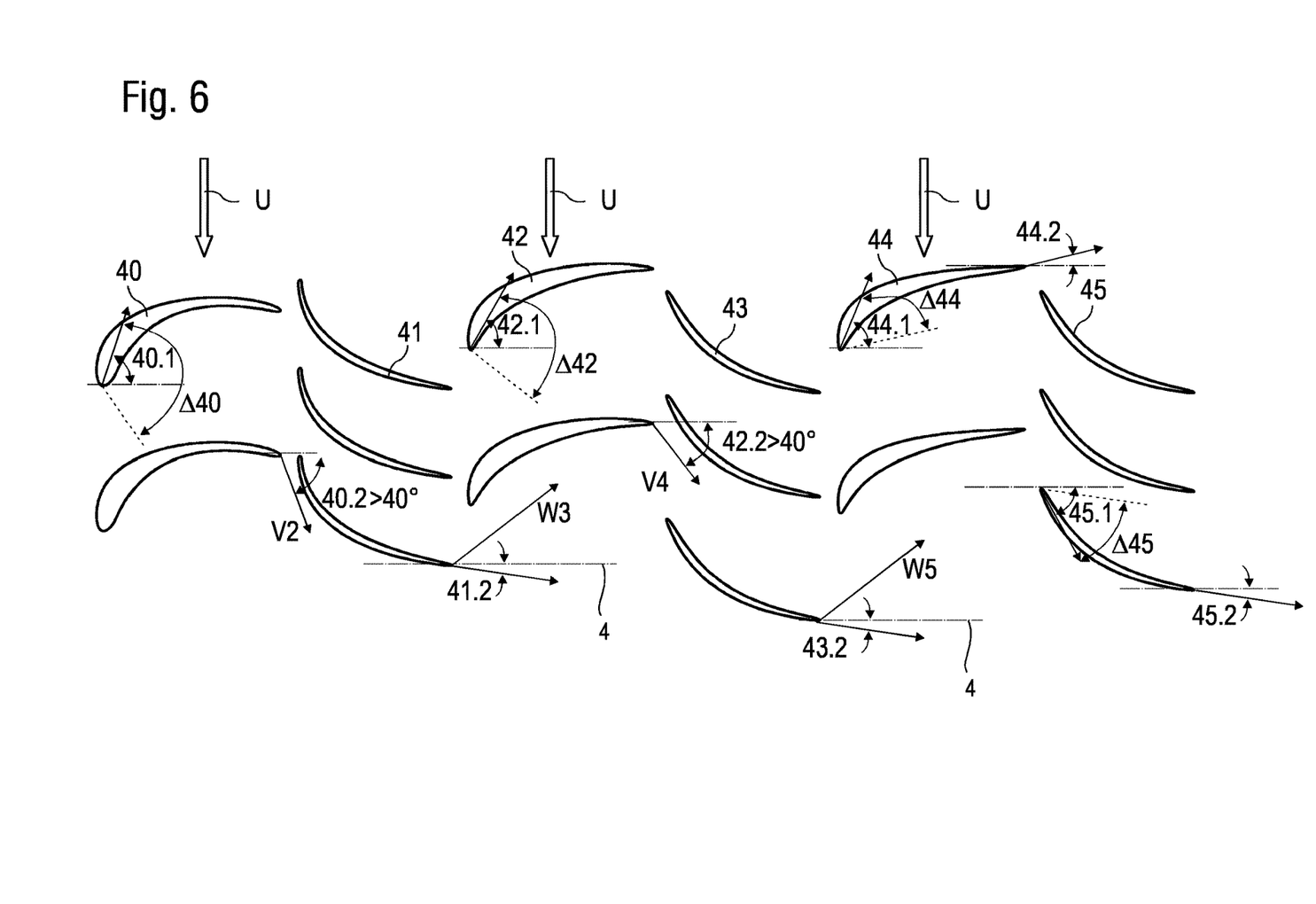
FIG. 6 exemplarily shows an example of a three-stage compressor in accordance with various embodiments of the present invention.

FIG. 6 shows an embodiment with three compression stages. In comparison to FIG. 5, this compressor includes an additional row of rotor blades 42 as well as an additional intermediate row of stator vanes 43.

The ratio $\Delta 40/\Delta 44$ is greater than or equal to 1.4 and the ratios $\Delta 40/\Delta 42$ and $\Delta 42/\Delta 44$ are greater than or equal to 1.2.

The angle 43.2 is greater than 15° on average over the height H of the blades 43 and is greater than 15°, in various instances 20°, over the radially outer portion (H7 in FIG. 4) extending over from 60% to 80% of the radial height of the blade 43.

It should be noted that in the present application, the rotor and stator vanes are presented with identical heights H while in practice variations in radial height and position of the blades may exist.

Finally, all the rotor blades are presented here as rotating at the same speed ω. The person skilled in the art will know how to apply the teaching of the present application to cases where the rows of rotor blades have different speeds.

What is claimed is:

1. A transonic compressor for an aircraft turbomachine, said compressor comprising:
   two annular rows of rotor blades; and
   one annular row of stator vanes interposed between the rows of rotor blades, wherein the rotor blades of the rows of rotor blades each have a radial height and a radially outer end having a velocity, wherein the stator vanes of the row of intermediate stator vanes each have a radial height, wherein, in a plane that is perpendicular to a radial direction and at a distance to an axis of rotation of the rotor blades, a flow of air leaves the row of stator vanes along a direction that forms a stator outlet airflow angle with an axial direction, and wherein when the rows of rotor blades are driven at a rotational speed such that the velocity of the radially outer end of the rotor blades is comprised between 360 m/s and 420 m/s, an average of the stator outlet airflow angle along the height of the stator vanes is greater than 15° and the stator outlet airflow angle is greater than 15° for all distances to the axis of rotation in a radial portion of the stator vanes that is comprised between 60% and 80% of the radial height of the stator vanes.

2. The transonic compressor according to claim 1, further comprising a downstream row of stator vanes, arranged downstream of the two rows of rotor blades, each stator vane of the downstream row having a radial height, wherein, in a plane that is perpendicular to a radial direction and at a distance to an axis of rotation of the rotor blades, the flow of air enters the row of stator vanes of the downstream row along a direction that forms a downstream stator inlet airflow angle with the axial direction, wherein, in a plane that is perpendicular to a radial direction and at a distance to an axis of rotation of the rotor blades, the flow of air leaves the row of stator vanes of the downstream row along a direction that forms a downstream stator outlet airflow angle with the axial direction, wherein in a radial portion of the stator vanes of the downstream row extending from 10% to 90% of their radial height, a difference between the downstream stator inlet angles and the downstream stator outlet angles is less than 40° for each distance to the axis of rotation, wherein in a radial portion of the stator vanes forming a radially inner part of the stator vanes below 10% of their radial height, a difference between the downstream stator inlet angles and the downstream stator outlet angles is less than 50° for each distance to the axis of rotation, and wherein in a radial portion of the stator vanes forming a radially outer part of the stator vane above 90% of their radial height, a difference between the downstream stator inlet angles and the downstream stator outlet angles is less than 50° for each distance to the axis of rotation.

3. The transonic compressor of claim 1, wherein the two rows of rotor blades comprise an upstream row and a downstream row, wherein, in a plane that is perpendicular to a radial direction and at a distance to an axis of rotation of the rotor blades, the flow of air enters each row of rotor blades along a direction that forms a rotor inlet angle with the axial direction, wherein, in a plane that is perpendicular to a radial direction and at a distance to an axis of rotation of the rotor blades, the flow of air leaves each row of rotor blades along a direction that forms a rotor outlet angle with the axial direction, wherein the rotor blades of the upstream row comprise an upstream average, along the height of the rotor blades, of a difference, for each given distance to the axis of rotation, between the rotor inlet angles and the rotor outlet angles, wherein the rotor blades of the downstream row comprise a downstream average, along the height of the rotor blades, of a difference, for each given distance to the axis of rotation, between the rotor inlet angles and the rotor outlet angles, and wherein the upstream average is greater than or equal to 1.4 times the downstream average.

4. The transonic compressor of claim 1, wherein the rotor blades have a first inner portion extending over 40% of the height of the rotor blades from an inner end of the blade, a second inner portion extending over 80% of the height of the rotor blades from an inner end of the blade, and an outer portion extending over 20% of the height of the rotor blades from the outer end of the rotor blades, and wherein the rotor blades are designed such that a velocity of the flow of air relative to the rotor blades is less than or equal to a Mach number of 0.9 in the first inner portion, is less than or equal to a Mach number of 1 in the second inner portion, and is less than or equal to a Mach number of 1.05 in the outer portion.

5. The transonic compressor of claim 1, wherein, in a plane that is perpendicular to a radial direction and at a distance to an axis of rotation of the rotor blades, the flow of air leaves each row of rotor blades along a direction that forms a rotor outlet angle with the axial direction, and wherein an average of the rotor outlet angle over the height of the rotor blades is greater than 40°.

6. The transonic compressor of claim 1, wherein the two rows of rotor blades comprise an upstream row and a downstream row, wherein a velocity at an outlet of the rotor blades of the upstream row is lower than a Mach number of 0.8.

7. The transonic compressor of claim 1, wherein the two rows of rotor blades comprise an upstream row and a downstream row, and an enthalpy variation of the air flow between an outlet and an inlet of the rotor blades in the upstream row is at least 1.4 greater than an enthalpy variation of the air flow between an outlet and an inlet of the rotor blades in the downstream row.

8. A turbomachine, said turbomachine comprising:
a transonic low-pressure compressor;
a high-pressure compressor;
a structural casing upstream of the transonic low-pressure compressor; and
an intermediate structural casing between the transonic low-pressure compressor and the high-pressure compressor, the structural casings delimiting a swan-neck-shaped air duct, wherein the transonic low-pressure compressor is arranged directly downstream of the upstream casing and directly upstream of the intermediate casing and wherein the transonic low-pressure compressor comprises two annular rows of rotor blades and one annular row of stator vanes interposed between the rows of rotor blades, wherein the rotor blades of the rows of rotor blades each have a radial height and a radially outer end having a velocity, wherein the stator vanes of the row of intermediate stator vanes each have a radial height, wherein, in a plane that is perpendicular to a radial direction and at a distance to an axis of rotation of the rotor blades, a flow of air leaves the row of stator vanes along a direction that forms a stator outlet airflow angle with an axial direction, and wherein when the rows of rotor blades are driven at a rotational speed such that the velocity of the radially outer end of the rotor blades is comprised between 360 m/s and 420 m/s, an average of the stator outlet airflow angle along the height of the stator vanes is greater than 15° and the stator outlet airflow angle is greater than 15° for all distances to the axis of rotation in a radial portion of the stator vanes that is comprised between 60% and 80% of the radial height of the stator vanes.

9. Turbomachine according to claim 8, further comprising a fan and a gearbox arranged between the transonic low-pressure compressors and the fan.

10. A method of operating a transonic compressor, wherein the transonic compressor comprises two annular rows of rotor blades and one annular row of stator vanes interposed between the rows of rotor blades, wherein the rotor blades of the rows of rotor blades each have a radial height and a radially outer end having a velocity, wherein the stator vanes of the row of intermediate stator vanes each have a radial height, wherein, in a plane that is perpendicular to a radial direction and at a distance to an axis of rotation of the rotor blades, a flow of air leaves the row of stator vanes along a direction that forms a stator outlet airflow angle with an axial direction, said method comprising driving the rows of rotor blades at a rotational speed such that the velocity of the radially outer end of the rotor blades is between 360 m/s and 420 m/s, an average of the stator outlet airflow angle along the height of the stator vanes is greater than 15° and the stator outlet airflow angle is greater than 15° for all distances to the axis of rotation in a radial portion of the stator vanes that is comprised between 60% and 80% of the radial height of the stator vanes.

* * * * *